(12) United States Patent
Wang et al.

(10) Patent No.: US 12,410,913 B2
(45) Date of Patent: Sep. 9, 2025

(54) SYSTEM AND METHOD FOR DESULFURIZING AND DECARBONIZING FLUE GAS

(71) Applicant: HUANENG CLEAN ENERGY RESEARCH INSTITUTE, Beijing (CN)

(72) Inventors: Shiqing Wang, Beijing (CN); Shiwang Gao, Beijing (CN); Shisen Xu, Beijing (CN); Ping Xiao, Beijing (CN); Minhua Jiang, Beijing (CN); Bin Huang, Beijing (CN)

(73) Assignee: HUANENG CLEAN ENERGY RESEARCH INSTITUTE, Beijing (CN)

( * ) Notice: Subject to any disclaimer, the term of this patent is extended or adjusted under 35 U.S.C. 154(b) by 465 days.

(21) Appl. No.: 17/823,320

(22) Filed: Aug. 30, 2022

(65) Prior Publication Data

US 2022/0412556 A1 Dec. 29, 2022

Related U.S. Application Data

(63) Continuation of application No. PCT/CN2021/112185, filed on Aug. 12, 2021.

(30) Foreign Application Priority Data

Aug. 14, 2020 (CN) .......................... 202010820840.8

(51) Int. Cl.
*B01D 53/50* (2006.01)
*B01D 53/62* (2006.01)
(Continued)

(52) U.S. Cl.
CPC .............. *F23J 15/04* (2013.01); *B01D 53/50* (2013.01); *B01D 53/502* (2013.01); *B01D 53/62* (2013.01);
(Continued)

(58) Field of Classification Search
CPC ........ B01D 53/34; B01D 63/46; B01D 53/50; B01D 53/62
See application file for complete search history.

(56) References Cited

U.S. PATENT DOCUMENTS

2013/0023712 A1 1/2013 Porcheron et al.
2017/0333831 A1 11/2017 Chen et al.

FOREIGN PATENT DOCUMENTS

CN 105194995 A * 12/2015
CN 110180317 8/2019

OTHER PUBLICATIONS

IPA, Office Action for AU Application No. 2021325250, Jun. 27, 2023.

(Continued)

*Primary Examiner* — Robert A Hopkins
(74) *Attorney, Agent, or Firm* — Hodgson Russ LLP

(57) ABSTRACT

A method for desulfurizing and decarbonizing a flue gas includes: feeding a boiler flue gas after denitrating and dedusting to a water cooler; cooling the boiler flue gas in the water cooler to a temperature near room temperature, and discharging condensed water; feeding a wet flue gas to a washing tower; washing and cooling the wet flue gas with a washing liquid to separate $H_2O$, $SO_2$ and $CO_2$ in a solid form from the flue gas; feeding a solid-liquid mixed slurry from a bottom of the washing tower to a solid-liquid separator to separate solid $H_2O$, $SO_2$ and $CO_2$ from the washing liquid; feeding the solid $H_2O$, $SO_2$ and $CO_2$ to a rectification separation column; separating $CO_2$ from $SO_2$ and $H_2O$ by a reboiler at a bottom of the rectification separation column; and discharging $CO_2$, $SO_2$ and $H_2O$.

15 Claims, 1 Drawing Sheet

(51) Int. Cl.
  *B01D 53/75* (2006.01)
  *B01D 53/78* (2006.01)
  *B01D 53/80* (2006.01)
  *F23J 15/04* (2006.01)
  *F23J 15/06* (2006.01)

(52) U.S. Cl.
  CPC ............ *B01D 53/75* (2013.01); *B01D 53/78* (2013.01); *B01D 53/80* (2013.01); *F23J 15/06* (2013.01); *B01D 2257/302* (2013.01); *B01D 2257/504* (2013.01); *B01D 2258/0283* (2013.01); *F23J 2215/20* (2013.01); *F23J 2215/50* (2013.01); *F23J 2219/40* (2013.01)

(56) References Cited

OTHER PUBLICATIONS

WIPO, International Search Report for PCT/CN2021/112185, Nov. 3, 2021.

\* cited by examiner

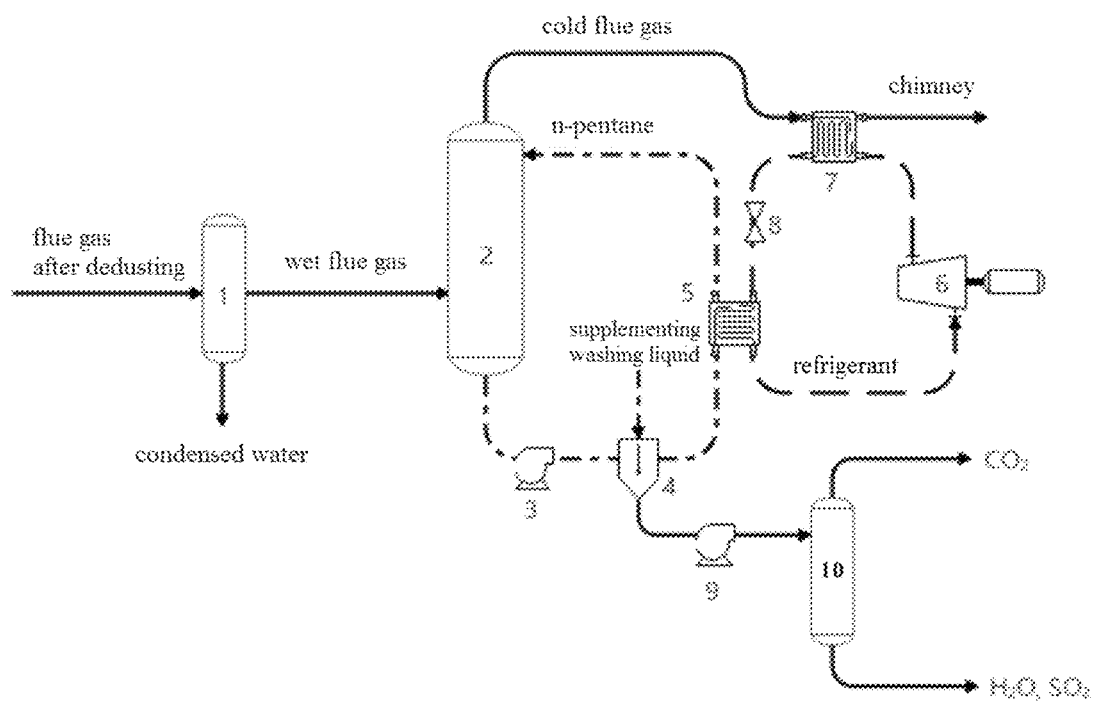

SYSTEM AND METHOD FOR DESULFURIZING AND DECARBONIZING FLUE GAS

CROSS-REFERENCE TO RELATED APPLICATIONS

This application a continuation of International Patent Application No. PCT/CN2021/112185, filed on Aug. 12, 2021, which claims priority to Chinese Patent Application No. 202010820840.8, filed on Aug. 14, 2020, the entire disclosures of which are incorporated herein by reference.

FIELD

The present disclosure relates to a technology field of flue gas pollution treatment and carbon emission reduction, and more particularly to a system and a method for desulfurizing and decarbonizing a flue gas.

BACKGROUND

Flue gas generated by thermal power generating units contains $SO_2$, $NO_x$ and other pollutants, and also contains a large amount of greenhouse gas, such as $CO_2$. The existing process for desulfurizing the flue gas generally adopts lye washing, referred to as wet desulfurization. The existing decarbonization technology is chemical absorption, such as alcohol ammonia absorption. The wet desulfurization process consumes a large amount of limestone or other chemicals, and is easy to generate a large amount of desulfurization wastewater. The chemical absorption decarbonization technology has high energy consumption and large loss of absorbent.

SUMMARY

Embodiments of the present disclosure seek to solve at least one of the problems existing in the related art to at least some extent.

According to a first aspect of the present disclosure, a system for desulfurizing and decarbonizing a flue gas is provided. The system includes: a water cooler, having a flue gas inlet for feeding a boiler flue gas after denitrating and dedusting, a condensed water outlet in a bottom of the water cooler, and a wet flue gas outlet, and configured to cool the boiler flue gas to a temperature near a room temperature to obtain a wet flue gas and condensed water; a washing tower, having a wet flue gas inlet communicated with the wet flue gas outlet, a cold flue gas outlet in a top of the washing tower, a washing liquid inlet in an upper part of the washing tower for receiving a washing liquid, and a solid-liquid mixture outlet in a bottom of the washing tower, and configured to receive the wet flue gas from the water cooler and separate $H_2O$, $SO_2$ and $CO_2$ in a solid form from the wet flue gas to obtain a cold fuel gas and a solid-liquid mixture comprising solid $H_2O$, $SO_2$ and $CO_2$ and the washing liquid; a solid-liquid separator, having a solid-liquid mixture inlet communicated with the solid-liquid mixture outlet, and a liquid outlet and a solid outlet, and configured to receive the solid-liquid mixture from the washing tower and separate the solid $H_2O$, $SO_2$ and $CO_2$ from the washing liquid; and a rectification separation column, having a solid inlet communicated with the solid outlet, a gaseous $CO_2$ outlet in a top of the rectification separation column, and an $H_2O$ and $SO_2$ outlet in a bottom of the rectification separation column, provided with a reboiler located at the bottom of the rectification separation column, and configured to receive the solid $H_2O$, $SO_2$ and $CO_2$ from the solid-liquid separator and separate $CO_2$ from $SO_2$ and $H_2O$ by the reboiler, discharge $CO_2$ from the top of the rectification separation column, and discharge $SO_2$ and $H_2O$ from the bottom of the rectification separation column.

According to a second aspect of the present disclosure, a method for desulfurizing and decarbonizing a flue gas is provided. The method includes: feeding a boiler flue gas after denitrating and dedusting to a water cooler; cooling the boiler flue gas in the water cooler to a temperature near room temperature to obtain a wet flue gas and condensed water, and discharging the condensed water; feeding the wet flue gas to a washing tower; washing the wet flue gas with a washing liquid sprayed from top to bottom in the washing tower and cooling the wet flue gas to a desublimation temperature of carbon dioxide, to separate $H_2O$, $SO_2$ and $CO_2$ in a solid form from the flue gas to obtain a cold fuel gas and a solid-liquid mixed slurry comprising solid $H_2O$, $SO_2$ and $CO_2$ and the washing liquid; transferring the solid-liquid mixed slurry from a bottom of the washing tower to a solid-liquid separator to separate solid $H_2O$, $SO_2$ and $CO_2$ from the washing liquid; feeding the solid $H_2O$, $SO_2$ and $CO_2$ to a rectification separation column by a thick slurry pump; heating the solid $H_2O$, $SO_2$ and $CO_2$ by a reboiler at a bottom of the rectification separation column to separate $CO_2$ from $SO_2$ and $H_2O$; and discharging $CO_2$ from a top of the rectification separation column, and discharging $SO_2$ and $H_2O$ from the bottom of the rectification separation column.

BRIEF DESCRIPTION OF THE DRAWINGS

These and other aspects and advantages of embodiments of the present disclosure will become apparent and more readily appreciated from the following descriptions made with reference to the drawings, in which:

FIG. 1 is a schematic diagram of a system for desulfurizing and decarbonizing a flue gas in some embodiments of the present disclosure.

DETAILED DESCRIPTION

Reference will be made in detail to embodiments of the present disclosure. The embodiments described herein with reference to drawings are illustrative, and used to generally understand the present disclosure. The embodiments shall not be construed to limit the present disclosure.

The present disclosure provides a system and a method for desulfurizing and/or decarbonizing a washing flue gas using low-temperature pentane, which is capable of washing and cooling the flue gas with the low-temperature pentane, and simultaneously condensing $SO_2$ and $CO_2$ and separating $SO_2$ and $CO_2$ from the flue gas, and is suitable for treating the flue gas that is dedust but not desulfurized.

The present system includes: a water cooler, having a flue gas inlet for feeding a boiler flue gas after denitrating and dedusting, a condensed water outlet in a bottom of the water cooler, and a wet flue gas outlet, and configured to cool the boiler flue gas to a temperature near a room temperature to obtain a wet flue gas and condensed water; a washing tower, having a wet flue gas inlet communicated with the wet flue gas outlet, a cold flue gas outlet in a top of the washing tower, a washing liquid inlet in an upper part of the washing tower for receiving a washing liquid, and a solid-liquid mixture outlet in a bottom of the washing tower, and configured to receive the wet flue gas from the water cooler and separate $H_2O$, $SO_2$ and $CO_2$ in a solid form from the wet flue gas to obtain a cold fuel gas and a solid-liquid mixture comprising solid $H_2O$, $SO_2$ and $CO_2$ and the washing liquid; a solid-liquid separator, having a solid-liquid mixture inlet communicated with the solid-liquid mixture outlet, and a liquid outlet and a solid outlet, and configured to receive the solid-liquid mixture from the washing tower and separate the solid $H_2O$, $SO_2$ and $CO_2$ from the washing liquid; and a rectification separation column, having a solid inlet communicated with the solid outlet, a gaseous $CO_2$ outlet in a top of the rectification separation column, and an $H_2O$ and $SO_2$ outlet in a bottom of the rectification separation column, provided with a reboiler located at the bottom of the rectification separation column, and configured to receive the solid $H_2O$, $SO_2$ and $CO_2$ from the solid-liquid separator and separate $CO_2$ from $SO_2$ and $H_2O$ by the reboiler, discharge $CO_2$ from the top of the rectification separation column, and discharge $SO_2$ and $H_2O$ from the bottom of the rectification separation column.

In some embodiments, the system further includes: an evaporator, provided in a first pipeline for communicating the liquid outlet with the washing liquid inlet, having a first refrigerant inlet and a first refrigerant outlet, and configured to receive the washing liquid from the solid-liquid separator and cool the washing liquid down to a preset temperature with a refrigerant; a compressor, having an inlet communicated with the first refrigerant outlet, and configured to receive and compress the refrigerant from the evaporator; and a condenser, provided in a second pipeline for connecting the cold flue gas outlet with a chimney, having a second refrigerant inlet communicated with an outlet of the compressor, and a second refrigerant outlet communicated with the first refrigerant inlet, and configured to exchange heat between the cold flue gas and the compressed refrigerant from the outlet of the compressor to obtain heated fuel gas and cooled refrigerant.

In some embodiments, the washing liquid is n-pentane.

In some embodiments, the system further includes a circulating pump provided in a third pipeline for connecting the solid-liquid mixture outlet with the solid-liquid separator.

In some embodiments, the system further includes a thick slurry pump provided in a fourth pipeline for connecting the solid outlet of the solid-liquid separator with the rectification separation column.

In some embodiments, the system further includes a washing liquid supplementary pipeline provided at a top of the solid-liquid separator.

In some embodiments, the boiler flue gas is cooled to about 30° C. in the water cooler.

In some embodiments, the preset temperature is about −120° C.

In some embodiments, the refrigerant is carbon tetrafluoride.

The present method for desulfurizing and decarbonizing a flue gas includes: feeding a boiler flue gas after denitrating and dedusting to a water cooler; cooling the boiler flue gas in the water cooler to a temperature near room temperature to obtain a wet flue gas and condensed water, and discharging the condensed water; feeding the wet flue gas to a washing tower; washing the wet flue gas with a washing liquid sprayed from top to bottom in the washing tower and cooling the wet flue gas to a desublimation temperature of carbon dioxide, to separate $H_2O$, $SO_2$ and $CO_2$ in a solid form from the flue gas to obtain a cold fuel gas and a solid-liquid mixed slurry comprising solid $H_2O$, $SO_2$ and $CO_2$ and the washing liquid; transferring the solid-liquid mixed slurry from a bottom of the washing tower to a solid-liquid separator to separate solid $H_2O$, $SO_2$ and $CO_2$ from the washing liquid; feeding the solid $H_2O$, $SO_2$ and $CO_2$ to a rectification separation column by a thick slurry pump; heating the solid $H_2O$, $SO_2$ and $CO_2$ by a reboiler at a bottom of the rectification separation column to separate $CO_2$ from $SO_2$ and $H_2O$; and discharging $CO_2$ from a top of the rectification separation column, and discharging $SO_2$ and $H_2O$ from the bottom of the rectification separation column.

In some embodiments, the method further includes: cooling the washing liquid from the solid-liquid separator to a preset temperature with a refrigerant in an evaporator, and feeding the cooled washing liquid to a top of the washing tower for recycling; compressing the refrigerant from the evaporator in a compressor; and feeding the cold fuel gas after desulfurization and decarbonization to a condenser to exchange heat with the compressed refrigerant from an outlet of the compressor to obtain heated fuel gas and cooled refrigerant, and discharging the heated fuel gas into a chimney.

In some embodiments, the boiler flue gas is cooled by means of indirect heat exchange or contact spray cooling.

In some embodiments, the boiler flue gas in the water cooler is cooled to about 30° C.

In some embodiments, the desublimation temperature of carbon dioxide is about −117° C.

In some embodiments, the washing liquid is cooled to about −120° C. with carbon tetrafluoride.

In some embodiments, the washing liquid is n-pentane.

In some embodiments, the method further includes: supplementing the washing liquid by a washing liquid supplementary pipeline at a top of the solid-liquid separator.

FIG. 1 shows a schematic diagram of a system for desulfurizing and decarbonizing a flue gas in some embodiments of the present disclosure. As shown in FIG. 1, The system includes a water cooler 1, a washing tower 2, a solid-liquid separator 4 and a rectification separation column 10. The water cooler 1 has a flue gas inlet for feeding a boiler flue gas after denitrating and dedusting, a condensed water outlet in a bottom of the water cooler 1, and a wet flue gas outlet. The wet flue gas outlet of the water cooler 1 is communicated with the low temperature n-pentane washing tower 2, and the washing tower 2 is configured to separate $H_2O$, $SO_2$ and $CO_2$ in a solid form from the wet flue gas. The washing tower 2 has a cold flue gas outlet in a top of the washing tower 2, a washing liquid inlet in an upper part of the washing tower 2 to feed a washing liquid, and a solid-liquid mixture outlet in a bottom of the washing tower 2. The system further includes a condenser 7, and the cold flue gas outlet is communicated with a chimney via the condenser 7. The system further includes a circulating pump 3, and the solid-liquid mixture outlet is communicated with the solid-liquid separator 4 via the circulating pump 3. The system further includes a washing liquid supplementary pipeline, which is provided at a top of the solid-liquid separator 4. The system further includes an evaporator 5, and a liquid outlet of the solid-liquid separator 4 is communicated with the washing liquid inlet via the evaporator 5. The system further includes a thick slurry pump 9, and a solid outlet of the solid-liquid separator 4 is communicated with the rectification separation column 10 via the thick slurry pump 9. A reboiler is located at a bottom of the rectification separation column 10. The rectification separation column 10 has a gaseous $CO_2$ outlet in a top of the rectification separation column 10, and an $H_2O$ and $SO_2$ outlet in a bottom of the rectification separation column 10. A refrigerant outlet of the condenser 7 is communicated with a refrigerant inlet of the evaporator 5 by a throttle valve 8. A refrigerant outlet of the evaporator 5 is communicated with an inlet of the compressor 6. An outlet of the compressor 6 is communicated with the refrigerant inlet of the condenser 7.

The boiler flue gas after denitrating and dedusting is fed to the water cooler 1. The boiler flue gas is cooled in a manner of indirect heat exchange or contact spray to a temperature near the room temperature, and the condensed water and a flue gas are discharged. The flue gas after cooling with water is a saturated wet flue gas and is fed to the low temperature n-pentane washing tower 2, and is washed and cooled with the low temperature n-pentane washing liquid sprayed from top to bottom until a desublimation temperature of carbon dioxide is reached. In this way, $H_2O$, $SO_2$ and $CO_2$ are separated in a solid form from the flue gas. Since $H_2O$, $SO_2$ and $CO_2$ are all insoluble in the pentane liquid, they form a solid-liquid mixed slurry with the pentane liquid after they condensed into the solid form. The solid-liquid mixed slurry flows out of the bottom of the washing tower 2, passes the circulating pump 3, to the solid-liquid separator 4 for separating solid $H_2O$, $SO_2$ and $CO_2$. The pentane washing liquid is cooled by a refrigerant in the evaporator 5 to a preset temperature, and is recycled to top of the washing tower 2. A low-temperature clean flue gas that is desulfurized and decarbonized is fed to the condenser 7 to exchange heat with the refrigerant that has a relatively high temperature from an outlet of the compressor 6, and the heated fuel gas is discharged to the chimney. Since the flue gas will take away a small amount of pentane, the pentane washing liquid is periodically supplemented in the solid-liquid separator 4 to maintain a flow balance. The solid $H_2O$, $SO_2$ and $CO_2$ separated by the solid-liquid separator 4 are a thick slurry mixture, which is input into the rectification separation column 10 by the thick slurry pump 9. The reboiler is provided at the bottom of the rectification separation column 10 and is configured to heat the mixture. $CO_2$ is gasified by heating and is separated from the top of the rectification separation column 10 as a by-product or for storage, and $SO_2$ and $H_2O$ are discharged from the bottom of the rectification separation column 10 for subsequent utilizations such as preparation of sulfuric acid.

With the present system and method, one or both of $SO_2$ and $CO_2$ of the flue gas can be removed.

The present disclosure adopts the low-temperature n-pentane to be sprayed and to cool the wet flue gas from a temperature level above zero degree centigrade to a temperature level below zero degree centigrade, and moisture in the flue gas is frozen at the temperature level below zero degree centigrade and is discharged from the cooling system together with liquid n-pentane, which will not cause ice blockage. In the related art, an indirect heat exchange process is adopted, which may pre-cool the raw flue gas to the temperature level below zero degree centigrade by recovering a cold energy of the low-temperature clean flue gas. In order to prevent the moisture in the flue gas from freezing and blocking a heat exchanger, it is necessary to provide a molecular sieve dehumidification system before cooling. The present method does not need to provide a molecular sieve flue gas drying tower. In addition, the cold energy of the low-temperature clean flue gas of the present disclosure is recovered by the condenser of the refrigeration system, thereby reducing the energy consumption of the refrigeration. Carbon dioxide and sulfur dioxide in the flue gas are condensed and removed from the flue gas at the same time, and carbon dioxide and sulfur dioxide are recycled separately by the rectification separation column due to different boiling points.

EXAMPLE

As shown in FIG. 1, a boiler flue gas after denitration, dedustion and desulfurization is fed to a water cooler 1, and is cooled to about 30° C. Condensed water is discharged. A saturated wet flue gas after cooling with water is fed to a low-temperature pentane washing tower 2, and is washed and cooled with a low-temperature pentane washing liquid sprayed from an upper part of the washing tower 2 and drops from top to bottom, and the flue gas is cooled to about −117° C. 90% of $CO_2$ in the flue gas is separated in a solid dry ice form and more than 99.99% of moisture in the flue gas is separated in a solid ice form. The dry ice and ice are mixed with the pentane washing liquid to form a solid-liquid mixed slurry. The solid-liquid mixed slurry flows out of a bottom of the washing tower 2 to a solid-liquid separator 4 via a circulating pump 3, and solid dry ice and ice are separated in the solid-liquid separator 4. The pentane washing liquid is cooled to about −120° C. by a refrigerant of carbon tetrafluoride in an evaporator 5, and is recycled to the washing tower 2 and is sprayed from the top of the washing tower to cool the flue gas. The low-temperature clean flue gas after decarbonization is fed to a condenser 7 to exchange heat with the refrigerant having a relatively high temperature at an outlet of a compressor 6 to recover cold energy, and is discharged to a chimney.

Comparative Example

A boiler flue gas after denitration, dedustion and desulfurization is fed to a water cooler, and is cooled to about 30° C. by water. Condensed water is discharged. A saturated wet flue gas after the cooling with water is fed to a molecular sieve drying tower. The molecular sieve tower adopts two towers, and the two towers separately perform processes such as drying, regeneration and cooling according to respective preset program. Moisture in the flue gas is purged out during a heating and regeneration process of the molecular sieve tower. The dry flue gas after drying by the molecular sieve tower is fed to a cold energy recovery device to exchange heat with a low-temperature clean flue gas, and is pre-cooled to a temperature level below zero degree centigrade. Since the moisture in the flue gas is removed by the molecular sieve, there will be no ice blockage in the cold energy recovery device. The flue gas after pre-cooled by the cold energy recovery device is fed to a low temperature washing cooling tower, and is washed and cooled to about −117° C. 90% of $CO_2$ in the flue gas is separated in a solid dry ice form, and is mixed with the low-temperature washing liquid to form a solid-liquid mixed slurry. The solid-liquid mixed slurry flows out of a bottom of the washing tower to a solid-liquid separator via a low-temperature circulating pump 3, and the solid dry ice is separated. The low-temperature washing liquid is cooled to about −120° C. by a refrigerant of carbon tetrafluoride in an evaporator, and is fed to the washing tower to be sprayed to cool the flue gas. The low-temperature clean flue gas after decarbonization is heated by a cold energy recovery device and discharged to a chimney.

Compared with the comparative example, the molecular sieve drying tower and the cold energy recovery device are omitted in Example of the present disclosure, and no blockage is caused by the cooling at the temperature level below zero degree centigrade. Further, the cold energy of the low-temperature clean flue gas is recovered through the condenser of the refrigeration system, which reduces consumption of the cooling water. Therefore, the system and the method of the present disclosure can be widely applied in practical industry.

Unless specified or limited otherwise, the terms "connected," "communicated," and "coupled" and variations thereof are used broadly and encompass such as mechanical or electrical connections, communications and couplings, also can be inner connections, communications and couplings of two components, and further can be direct and indirect connections, communications and couplings, which can be understood by those skilled in the art according to the detail embodiment of the present disclosure.

In addition, as is employed herein, the term "about" when employed in conjunction with a value such as a temperature is intended to mean the stated value and a range of values one having ordinary skill in the art would recognize as providing a composition having the properties of the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "an example," or "some examples," means that a particular feature, structure, material, or characteristic described in connection with the embodiment or example is included in at least one embodiment or example of the present disclosure. Thus, the appearances of the phrases such as "in an embodiment," "in some embodiments," "in one embodiment", "in an example," or "in some examples" in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A system for desulfurizing and decarbonizing a flue gas, comprising:
    a water cooler, having a flue gas inlet for feeding a boiler flue gas after denitrating and dedusting, a condensed water outlet in a bottom of the water cooler, and a wet flue gas outlet, and configured to cool the boiler flue gas to obtain a wet flue gas and condensed water;
    a washing tower, having a wet flue gas inlet communicated with the wet flue gas outlet, a flue gas discharge outlet in a top of the washing tower, a washing liquid inlet in an upper part of the washing tower for receiving a washing liquid, and a solid-liquid mixture outlet in a bottom of the washing tower, and configured to receive the wet flue gas from the water cooler and separate $H_2O$, $SO_2$ and $CO_2$ in a solid form from the wet flue gas to obtain a flue gas discharge and a solid-liquid mixture comprising solid $H_2O$, $SO_2$ and $CO_2$ and the washing liquid;
    a solid-liquid separator, having a solid-liquid mixture inlet communicated with the solid-liquid mixture outlet, and a liquid outlet and a solid outlet, and configured to receive the solid-liquid mixture from the washing tower and separate the solid $H_2O$, $SO_2$ and $CO_2$ from the washing liquid;
    a washing liquid supplementary pipeline provided at a top of the solid-liquid separator; and
    a rectification separation column, having a solid inlet communicated with the solid outlet, a gaseous $CO_2$ outlet in a top of the rectification separation column, and an $H_2O$ and $SO_2$ outlet in a bottom of the rectification separation column, provided with a reboiler located at the bottom of the rectification separation column, and configured to receive the solid $H_2O$, $SO_2$ and $CO_2$ from the solid-liquid separator and separate $CO_2$ from $SO_2$ and $H_2O$ by the reboiler, discharge $CO_2$ from the top of the rectification separation column, and discharge $SO_2$ and $H_2O$ from the bottom of the rectification separation column.

2. The system according to claim 1, further comprising:
    an evaporator, provided in a first pipeline for communicating the liquid outlet with the washing liquid inlet, having a first refrigerant inlet and a first refrigerant outlet, and configured to receive the washing liquid from the solid-liquid separator and cool the washing liquid down to a preset temperature with a refrigerant;
    a compressor, having an inlet communicated with the first refrigerant outlet, and configured to receive and compress the refrigerant from the evaporator; and
    a condenser, provided in a second pipeline for connecting the flue gas discharge outlet with a chimney, having a second refrigerant inlet communicated with an outlet of the compressor, and a second refrigerant outlet communicated with the first refrigerant inlet, and configured to exchange heat between the flue gas discharge and the compressed refrigerant from the outlet of the compressor to obtain heated flue gas and cooled refrigerant.

3. The system according to claim 1, wherein the washing liquid is n-pentane.

4. The system according to claim 1, further comprising a circulating pump provided in a third pipeline for connecting the solid-liquid mixture outlet with the solid-liquid separator.

5. The system according to claim 1, further comprising a thick slurry pump provided in a fourth pipeline for connecting the solid outlet of the solid-liquid separator with the rectification separation column.

6. The system according to claim 1, wherein the boiler flue gas is cooled to about 30° C. in the water cooler.

7. The system according to claim 2, wherein the preset temperature is about -120° C.

8. The system according to claim 2, wherein the refrigerant is carbon tetrafluoride.

9. A method for desulfurizing and decarbonizing a flue gas, comprising:
feeding a boiler flue gas after denitrating and dedusting to a water cooler;
cooling the boiler flue gas in the water cooler to obtain a wet flue gas and condensed water, and discharging the condensed water;
feeding the wet flue gas to a washing tower;
washing the wet flue gas with a washing liquid sprayed from top to bottom in the washing tower and cooling the wet flue gas to a desublimation temperature of carbon dioxide, to separate $H_2O$, $SO_2$ and $CO_2$ in a solid form from the flue gas to obtain a flue gas discharge and a solid-liquid mixed slurry comprising solid $H_2O$, $SO_2$ and $CO_2$ and the washing liquid;
transferring the solid-liquid mixed slurry from a bottom of the washing tower to a solid-liquid separator to separate solid $H_2O$, $SO_2$ and $CO_2$ from the washing liquid;
supplementing the washing liquid by a washing liquid supplementary pipeline at a top of the solid-liquid separator;
feeding the solid $H_2O$, $SO_2$ and $CO_2$ to a rectification separation column by a thick slurry pump;
heating the solid $H_2O$, $SO_2$ and $CO_2$ by a reboiler at a bottom of the rectification separation column to separate $CO_2$ from $SO_2$ and $H_2O$; and
discharging $CO_2$ from a top of the rectification separation column, and discharging $SO_2$ and $H_2O$ from the bottom of the rectification separation column.

10. The method according to claim 9, further comprising:
cooling the washing liquid from the solid-liquid separator to a preset temperature with a refrigerant in an evaporator, and feeding the cooled washing liquid to a top of the washing tower for recycling;
compressing the refrigerant from the evaporator in a compressor; and
feeding the flue gas discharge after desulfurization and decarbonization to a condenser to exchange heat with the compressed refrigerant from an outlet of the compressor to obtain heated flue gas and cooled refrigerant, and discharging the heated flue gas into a chimney.

11. The method according to claim 9, wherein cooling the boiler flue gas in the water cooler comprises:
cooling the boiler flue gas through indirect heat exchange or contact spray cooling.

12. The method according to claim 9, wherein cooling the boiler flue gas in the water cooler comprises:
cooling the boiler flue gas in the water cooler to about 30° C.

13. The method according to claim 9, wherein the desublimation temperature of carbon dioxide is about −117° C.

14. The method according to claim 10, wherein cooling the washing liquid to the preset temperature with the refrigerant in the evaporator comprises:
cooling the washing liquid to about −120° C. with carbon tetrafluoride.

15. The method according to claim 9, wherein the washing liquid is n-pentane.

\* \* \* \* \*